Patented May 4, 1954

2,677,708

UNITED STATES PATENT OFFICE 2,677,708

SYNTHESIS OF ALKOXY ACETALS AND ALKOXY KETALS, AND SULFUR ANALOGS THEREOF

John W. Copenhaver, Short Hills, N. J., assignor to General Aniline & Film Corporation, New York, N. Y., a corporation of Delaware No Drawing. Application September 22, 1950,
Serial No. 186,315

13 Claims. (Cl. 260—609)

This invention relates to a method of preparing reaction products of orthoesters or othothioesters with ethylenically unsaturated hydrocarbons, particularly isobutylene, indene and cyclopentadiene, and to the products produced thereby.

I have discovered that orthoesters and orthothioesters can be reacted with ethylenically unsaturated hydrocarbons, such as isobutylene, indene and cyclopentadiene in the presence of an acid-reacting condensing agent to produce new chemical compounds.

The invention is generally applicable to the reaction of ethylenically unsaturated hydrocarbons, such as isobutylene, indene and cyclopentadiene, with orthoesters and orthothioesters of the formula:

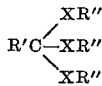

wherein R' is hydrogen or hydrocarbon, preferably alkyl and more preferably lower alkyl; X is a chalcogen of atomic weight less than 33, i. e., oxygen or sulphur; the R''s are radicals of an alcohol or phenol, e. g., aliphatic, aromatic, alicyclic radicals including oxygen and sulphur interrupted aliphatic hydrocarbon radicals, or two of the R''s together may be a bivalent radical of a polyhydric alcohol, polythiol or mercapto alcohol, in the presence of an acid-reacting condensing agent.

The reaction products of this invention may accordingly be represented by the formula

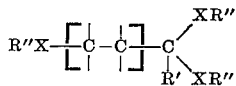

in which the portion in brackets represents a compound selected from the group consisting of isobutylene, indene and cyclopentadiene and R', X and R'' have the values given above.

As examples of orthoesters and orthothioesters which may be employed in practicing the present invention may be mentioned the orthoesters, orthotrithioesters, orthodithioesters, and orthomonothioesters of formic, acetic, propionic, butyric, benzoic, phenylacetic acids and the like, with alcohols and thiols such as the methyl, ethyl, propyl, butyl, allyl, cyclohexyl, benzyl and phenyl ethyl alcohols and mercaptans, ethane, propane and butane dialcohols and dithiols, phenol, thiophenol, cresols, thiocresols, mercaptoethanol, diethylene glycol and monoalkyl ethers thereof, di(betahydroxyethyl) sulfide and monoalkyl ethers thereof, di(hydroxyphenyl) ether, di(hydroxyphenyl) thioether, and the like. The term "orthothioester" as employed herein and in the appended claims includes mixed oxygen and sulfur orthoesters in addition to the orthotrithioesters. The terms "alcohol" and "phenol" as employed herein and in the appended claims include mono- and polyhydric alcohols and phenols and sulphur analogs thereof. The lower alkyl orthoesters of lower fatty acids are preferred, such as methyl orthoformate, ethyl orthoformate, ethyl thioorthoformate, propyl orthoformate and the like.

While the ethylenically unsaturated hydrocarbons employed are generally isobutylene, indene or cyclopentadiene, derivatives thereof substituted by hydrocarbons and other inert groups which do not affect the reactivity of the ethylenic bond may also be employed.

The catalyst employed in practicing the present invention, is, as mentioned, an acid-reacting condensing agent. As examples of suitable catalysts there may be mentioned such acid-reacting condensing agents as boron trifluoride and its complexes with ether, boron trichloride, stannic chloride, titanium chloride, sulfuric acid and the like. The amount of catalyst is not highly critical and may be varied from mere traces to about 0.1 mol of catalyst per mol of orthoester. However, for best results, employing a catalyst like boron trifluoride, amounts within the range of 0.0001 to 0.01 mol of catalyst per mol of orthoester are employed.

It has been found that the reaction is operable through a relatively wide temperature range and no critical limits for temperature have been established. However, while temperatures below 0° C. are operative, no advantage has been found in employing lower temperatures and likewise temperatures above about 50° C. are preferably avoided, since there is no advantage in their use, although the process is operative at temperatures of 100° C. or even higher. When the temperature employed is above the boiling point of any of the reactants, the process can advantageously be carried out under superatmospheric pressure; otherwise, atmospheric pressure may be employed.

The following examples illustrate specific embodiments of the invention, although it is to be understood that the invention is not to be limited thereby.

EXAMPLE I

*Addition of ethyl orthoformate to isobutylene*

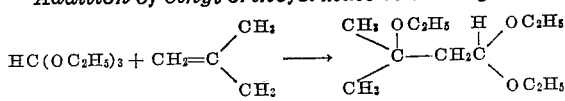

444 g. (3.0 moles) ethyl orthoformate and
6 ml. boron fluoride etherate were mixed, cooled to −10 −20° C. and charged to a precooled pressure vessel.

82 g. liquid isobutylene was then charged to the bomb which was sealed and heated to 35° C. with shaking for 16 hours. Pressure developed, about 30 lbs. maximum. The bomb was discharged and the catalyst neutralized by the addition of ethanolamine. The neutralized mixture was then distilled to give a product, boiling at 93–97° C./21 mm., $n_D^{25}$ 1.4135.

*Analysis:*—Calc. for $C_{11}H_{24}O_3$: C, 64.66; H, 11.84. Found: C, 64.48; H, 11.60.

The identity of the reaction product was proven by reaction with 2,4-dinitrophenyl hydrazine to yield the 2,4-dinitrophenylhydrazone of β-methyl crotonaldehyde, M.P. 179–180.

*Analysis:*—Calc. for $C_{11}H_{12}O_4N_4$: C, 50.00; H, 4.58; N, 21.20. Found: C, 49.97; H, 4.74; N, 20.99.

The melting point for the 2,4-dinitrophenyl hydrazine of β-methyl crotonaldehyde (senecialdehyde) prepared by another method was also found to be 179–180° C.

EXAMPLE II

*Addition of ethyl trithioorthoformate to isobutylene*

Isobutylene was reacted with ethyl trithioorthoformate employing the procedure followed in Example I. The compound obtained may be represented by the formula:

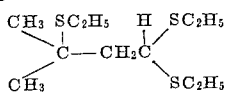

EXAMPLE III

*Addition of ethyl orthoformate to indene*

444 g. (3.0 mole) ethyl orthoformate and
6 ml. $BF_3 \cdot O(C_2H_5)_2$ were placed in a 1-liter, 3-necked flask
116 g. (1.0 mole) indene, B.P. 96–97°/55 mm. $n_D^{25}$ 1.5720 was added from dropping funnel during 1 hour. No apparent temperature effect. Yellow color of solution at beginning of addition slowly turned to dark red. Stirred 4¾ hours after complete addition and left overnight. Stirred 5 hours more at room temperature.

9.5 ml. diethanol amine were then added to neutralize catalyst, pH 8. Distilled brown-red solution.

The expected 1:1 adduct boiled at 128–130° C./4 mm., $n_D^{25}$ 1.4907.

The probable course of the reaction and its produce may be represented as follows:

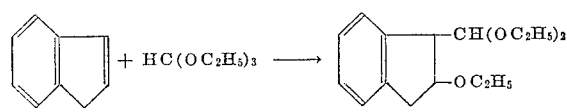

*Analysis:*—Calc for $C_{16}H_{24}O_3$: C, 72.69; H, 9.15. Found: C, 72.52; H, 9.08.

Reaction with 2,4-dinitrophenylhydrazine gave the 2,4-dinitrophenyl hydrazone of the ethoxyaldehyde, M. P. 161–3° C.

*Analysis:*—Calc for $C_{18}H_{18}O_5N_4$: C, 58.37; H, 4.90; N, 15.13. Found: C, 58.54; H, 4.83; N. 15.20.

EXAMPLE IV

*Addition of ethyl trithioorthoformate to indene*

Ethyl trithioorthoformate was reacted with indene following the procedure of Example III. The product obtained may be represented by the formula:

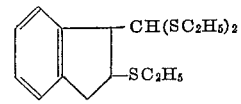

EXAMPLE V

*Addition of ethyl orthoformate to cyclopentadiene*

444 g. (3.0 moles) ethyl orthoformate and
5 ml. boron fluoride etherate were charged in a 1-liter, 3-necked flask, and
66 g. (1.0 mole) cyclopentadiene (obtained from dicyclopentadiene by atmospheric distillation, and used immediately) was added from a dropping funnel during 20 minutes. The temperature rose 10° C. spontaneously to a maximum of 35° C., and the originally colorless solution became dark red. The reaction mixture was stirred 2.5 hours and was left overnight.

90 ml. diethanolamine was added to neutralize the catalyst and the solution was distilled. There was obtained 58 g. of a colorless liquid, B.P. 120–126° C./24 mm., $n_D^{25}$ 1.4403.

The probable course of the reaction and its product may be represented as follows:

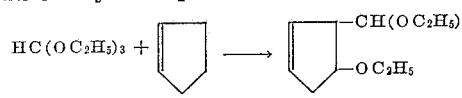

*Analysis:*—Calc. for $C_{12}H_{22}O_3$: C, 67.25; H, 10.35. Found: C, 68.22; H, 10.51.

EXAMPLE VI

*Addition of ethyl trithioorthoformate to cyclopentadiene*

Ethyl trithioorthoformate was reacted with cyclopentadiene employing the procedure followed in Example V. The product obtained may be represented by the formula:

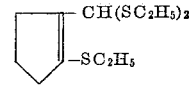

The products of the present invention are useful in preparing antidusting dyestuff compositions, antioxidant compositions for rubber and lubricating oils, and chemical intermediates in organic syntheses. For example, the isobutylene-orthoformate product can be hydrolyzed and then dealcoholated to give beta-methyl crotonaldehyde which is a potentially valuable intermediate in many projected syntheses of vitamin A.

My invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

I claim:

1. A process which comprises reacting an ethylenically unsaturated hydrocarbon selected from the group consisting of isobutylene, indene and cyclopentadiene with a compound selected from the group consisting of orthoesters and orthothioesters in the presence of an acid-reacting condensing agent.

2. A process which comprises reacting isobutylene with a compound selected from the group consisting of orthoesters and orthothioesters in the presence of an acid-reacting condensing agent.

3. A process which comprises reacting indene with a compound selected from the group consisting of orthoesters and orthothioesters in the presence of an acid-reacting condensing agent.

4. A process which comprises reacting cyclopentadiene with a compound selected from the group consisting of orthoesters and orthothioesters in the presence of an acid-reacting condensing agent.

5. A process which comprises reacting isobutylene with ethylorthoformate in the presence of an acid-reacting condensing agent.

6. A process which comprises reacting indene with ethylorthoformate in the presence of an acid-reacting condensing agent.

7. A process which comprises reacting cyclopentadiene with ethylorthoformate in the presence of an acid-reacting condensing agent.

8. Compounds of the formula

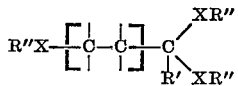

in which the portion in brackets represents a compound selected from the group consisting of isobutylene, indene and cyclopentadiene; R' is a member of a group consisting of hydrogen and hydrocarbon; the X's are selected from the group consisting of —O— and —S— and the R''s are members of the group consisting of alcohol and phenol radicals.

9. The compound of the formula

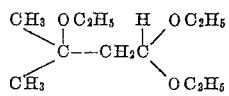

10. The compound of the formula

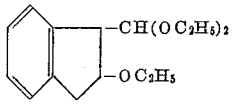

11. The compound of the formula

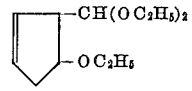

12. The compound of the formula

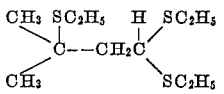

13. The compound of the formula

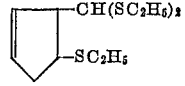

References Cited in the file of this patent

UNITED STATES PATENTS

| Number | Name | Date |
|---|---|---|
| 2,191,564 | Graenacher et al. | Feb. 27, 1940 |
| 2,352,435 | Hoeffelman et al. | June 27, 1944 |
| 2,369,612 | Schirm | Feb. 13, 1945 |
| 2,392,294 | Rust et al. | Jan. 1, 1946 |
| 2,500,486 | Copenhaver | Mar. 14, 1950 |